(12) United States Patent
Bartels et al.

(10) Patent No.: US 10,496,962 B1
(45) Date of Patent: Dec. 3, 2019

(54) DYNAMIC DIGITAL CALENDAR DAY KANBAN BOARD

(71) Applicants: Bryan Gregory Bartels, The Woodlands, TX (US); Patrick Humpal, Fair Oaks, CA (US)

(72) Inventors: Bryan Gregory Bartels, The Woodlands, TX (US); Patrick Humpal, Fair Oaks, CA (US)

( * ) Notice: Subject to any disclaimer, the term of this patent is extended or adjusted under 35 U.S.C. 154(b) by 0 days.

(21) Appl. No.: 15/995,156

(22) Filed: Jun. 1, 2018

(51) Int. Cl.
*G06Q 10/10* (2012.01)
*G06F 3/0484* (2013.01)

(52) U.S. Cl.
CPC ....... *G06Q 10/1097* (2013.01); *G06F 3/0484* (2013.01)

(58) Field of Classification Search
CPC ............ G06Q 10/00–50/00; G06F 1/00–21/00
USPC ................................................ 705/7.11–7.42
See application file for complete search history.

(56) References Cited

U.S. PATENT DOCUMENTS

| | | | | |
|---|---|---|---|---|
| 6,714,829 B1* | 3/2004 | Wong | ............... | G06Q 10/06312 700/101 |
| 7,020,594 B1* | 3/2006 | Chacon | ................. | G06Q 10/04 700/100 |
| 9,239,719 B1* | 1/2016 | Feinstein | ............... | G06Q 10/00 |
| 2009/0235182 A1* | 9/2009 | Kagawa | ................ | G06Q 10/06 715/753 |
| 2010/0138268 A1* | 6/2010 | Guo | ....................... | G06Q 10/06 705/7.11 |
| 2010/0269049 A1* | 10/2010 | Fearon | ................. | G06Q 10/109 715/744 |
| 2010/0318558 A1* | 12/2010 | Boothroyd | .......... | G06F 16/9032 707/769 |
| 2011/0131514 A1* | 6/2011 | Alberth, Jr. | .......... | G06Q 10/109 715/764 |

(Continued)

OTHER PUBLICATIONS

Bohn, Daniel. "Design Kanban: A freeform Kanban system for creative teams." https://medium.com/@danielb0hn/design-kanban-a-freeform-kanban-system-for-creative-teams-a17350089de5 (Sep. 8, 2016). (Year: 2016).*

(Continued)

*Primary Examiner* — Alan S Miller

(57) ABSTRACT

The invention described herein with reference to the drawing figures, with portions of the drawings enumerated and referenced herein. An embodiment in accordance with the present invention discloses and describes the computer implemented method for creating and manipulating a dynamic digital business day Kanban board on a computing device with cards available to users with local and remote access, which allows the users and events to create cards associated with a progress status and behaviors, stored instructions, combined with the ability to group, view, and organize the created cards in a plurality of sections some of which are associated to calendar days. Based on user interactions with the dynamic digital business day Kanban board point value calculations results are created, aggregated, stores, transmitted, and displayed to a number of users. The invention includes a network connected electronic device for receiving instructions from the computing device to represent the dynamic digital business day Kanban board's activity and point value calculation results in a numeric, visual, and auditory manner.

17 Claims, 15 Drawing Sheets

(56) References Cited

U.S. PATENT DOCUMENTS

| | | | | |
|---|---|---|---|---|
| 2012/0116834 A1* | 5/2012 | Pope | ................ | G06Q 10/06316 |
| | | | | 705/7.26 |
| 2012/0116835 A1* | 5/2012 | Pope | ................ | G06Q 10/06316 |
| | | | | 705/7.26 |
| 2012/0239451 A1* | 9/2012 | Caligor | ................ | G06Q 10/00 |
| | | | | 705/7.21 |
| 2013/0006688 A1* | 1/2013 | Knapp | ................ | G06Q 10/101 |
| | | | | 705/7.15 |
| 2013/0007694 A1* | 1/2013 | Knapp | ................ | G06Q 10/10 |
| | | | | 717/103 |
| 2016/0140473 A1* | 5/2016 | Hodes | ................ | G06Q 10/1097 |
| | | | | 705/7.21 |
| 2016/0378549 A1* | 12/2016 | Irish | ................ | H04L 67/1002 |
| | | | | 718/107 |
| 2018/0053127 A1* | 2/2018 | Boileau | ................ | G06Q 10/0631 |
| 2018/0365608 A1* | 12/2018 | Powell | ................ | G06F 9/50 |

OTHER PUBLICATIONS

Kanban Project Software | Smartsheet. https://www.smartsheet. com/ . . . tm_source=bing&utm_medium=cpc&utm_campaign= search& msclkid=38bb2e8f333413abb2937255fb94c457). (2016). (Year: 2016).*

* cited by examiner

Section from Board View

Stack View

Productivty Point Value
Calculation Reports

Category Productivity Chart

Productivity Chart

4808 Productivity points this year

DYNAMIC DIGITAL CALENDAR DAY KANBAN BOARD

CROSS-REFERENCE TO RELATED APPLICATIONS

This patent application claims the benefit of the filing date of the U.S. Provisional Patent Application Ser. No. 62/514,841 filed on Jun. 3, 2017, and titled "Dynamic Digital Calendar Day Kanban Board," the entire content of which is hereby expressly incorporated by reference.

BACKGROUND OF THE INVENTION

The modern worker, student, and home maker is increasingly inundated with tasks, reminders, notes, and the like, that one must organize and manage in order to successfully complete one's duties. Additionally, the modern person must be flexible and agile in one's approach to managing one's work to keep pace with the ever changing and demanding environment be it work, school, or home.

The increased volume of tasks, reminders, and notes and the like ("Action Items") that a person must manage in the current, complex, rapidly changing environment has led many individuals, that work in accounting offices, go to school, or manage a household, to use traditional tools such as checklists or calendar appointments as methods to keep the growing list of Action Items under control and organized. These methods work well for individuals with Action Items that have need to be completed on or by a particular day or time, but at the same time, these methods are a bit clumsy in the shadow of the modern environment. Recreating a new checklist to accommodate frequent updates or mixing completed and incomplete Action Items on a single list can cause confusion and distract from the remaining Action Items which still need attention. Using calendar appointments is not much better, while Action Items on the current day get attention, any uncompleted Action Items from previous days are hopelessly left behind, unless one religiously engages in rescheduling all uncompleted Action Items at the end of every day. These methods leave a person spending a much greater portion of one's time than desired to simply manage the Action Items rather than actually taking action. Additionally, these methods are very personalized and local which works poorly to meet the collaborative or remote management needs often needed in the modern environment. The structure provided by these methods and the strong likelihood that one' Action Items have to be completed on or by a particular calendar day or at a time make these methods difficult to abandon, however, these methods lack the flexibility and agility needed by most workers, students, and home makers in the modern environment.

Other workers and teams, more of the likes of software developers and engineers, have abandoned the above methods for the stated reasons and have moved to a more visual, agile, and less disciplined approach of task management by adding Action Items to Post-it Notes and placing these notes on whiteboards, walls panels, or inputting the same into spreadsheets or an online equivalent. This method is far more agile than the checklist and calendar appointment methods and allows Action Items to be moved around the whiteboard or spreadsheet to show the current status of each Action Item. Engineers and software developers work through the Action Items in an agile and rapid fashion matching the natural workflow as they work on unique Action Items which highly depend on the relationship between Action Items but have little dependence on the day of week or day of the month. Because it lacks a strong dependence on the calendar day, this agile method works poorly in structured accounting environments, traditional classrooms and home environments, in which Actions Items are common, recurring, and completion is highly dependent on a particular calendar day or time.

The modern worker, student, and homemaker is left with a no-win situation for managing tasks, reminders, and notes. These individuals must sacrifice either using the structured list and calendar appointments method or an unstructured visual and agile method neither of which fully satisfy the existing need of being both structured and agile.

BRIEF SUMMARY OF INVENTION

Described herein is a computer-implemented technology for managing tasks, reminders, notes, and the like, by leveraging the traditional methods of checklists and calendar appointments, typically used by accounting teams, with the unstructured visual and agile approach used by engineers and software developers.

The dynamic digital Kanban board allows for task, reminder, and note management to be both visual, agile, and simple but allows tasks, reminders, and notes to be highly structured around business and work days or calendar days.

The invention allows for the dynamic digital business day Kanban board to be stored in computer-accessible memory and accessible from network connected devices. The invention allows for the board to be displayed with a core grouping of sections in which each section in the core group is associated with a calendar day or a non-standard time unit such as a business day or work day. Cards representing tasks, reminders, and notes can be placed in any of the infinite number of sections associated with a specific calendar day or business day and be associated with structured and unstructured data.

Each section has further subsections relating to each card's potential progress status. This allows all the cards associated with a specific calendar day section or business day to be viewed in isolation in a visual, agile, and simple representation based on progress status.

The invention also allows for cards to have specific automatic behaviors that allow for cards representing common and frequent tasks, reminders, and notes to be duplicated and associated with multiple sections which are associated with different calendar days.

Additionally, the invention allows for automatic behavior to associate a card with a subsequent calendar day based on the card's progress status.

Additionally, the invention allows for the automatic behavior to manipulate the data associated with a card based on card's age.

Additionally, the invention allows for any changes in any card association to be measured and quantified providing the user or users with a productivity score or point value. This score or point value can be aggregated and displayed to a single user or users.

The invention is described more fully in the detailed description herein.

DETAILED DESCRIPTION OF THE INVENTION

This patent application claims the benefit of the filing date of the U.S. Provisional Patent Application Ser. No. 62/514,841 filed on Jun. 3, 2017, and titled "Dynamic Digital Calendar Day Kanban Board," the entire content of which is hereby expressly incorporated by reference.

Figure 1:
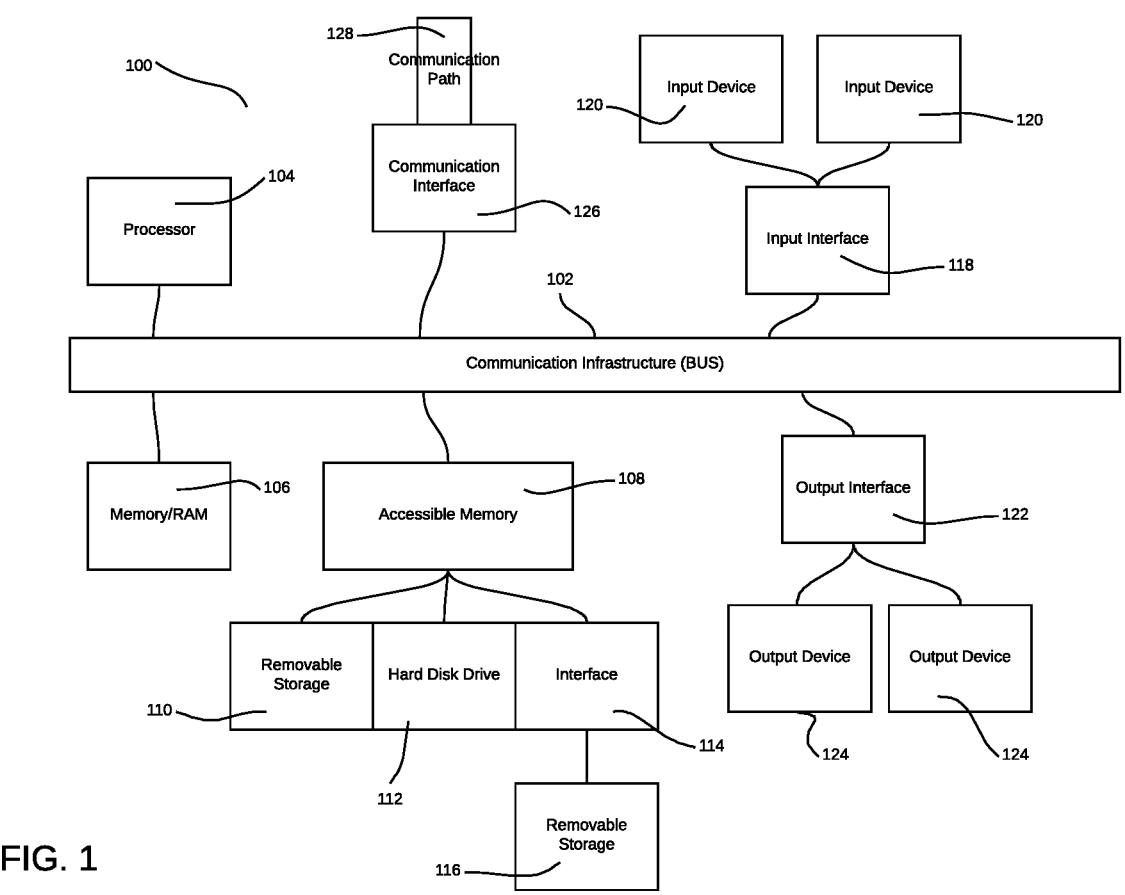
FIG. 1 is an illustration of components of a computing device working the invention.

FIG. 1 illustrates a computing device 100 consisting of many components and contains the software for implementing the invention according to an embodiment of the invention. In the illustrated embodiment, the computing device 100 includes a centralized communication infrastructure (BUS) 102, a processor 104, memory/RAM 106, accessible memory 108 which is illustrated with removable storage 110, a hard disk drive 112, and an interface 114 to communicate with additional removable storage 116, an input interface 118, connected to one or more input devices 120, and an output interface 122 connected to one or more output devices 224.

The computing device illustrated in 100 can have several embodiments. A likely embodiment would include a centralized communication infrastructure 102 to allow the processor 104 to communicate with and execute the computer-implemented method based on the stored instructions in the accessible memory 108. In some embodiments, to execute the instructions, the processor 104, may need send data requests and receive data to an external source through the communication interface or a network adapter which provides the computing device with the ability to communicate with remote devices such as clients and may be an ethernet, wireless or fiber channel adapter 126 through some communication path 128 or needed data may be stored on removable storage 110 or 116. The secondary memory 116 and other data sources discussed herein, would have the ability to store data for later recall and use by the processor 104. An embodiment of a computing device would also contain some type of some type of random-access memory (RAM), read-only memory (ROM), flash memory, or the like, or a combination of such devices 106.

The processor 104, accessible memory 108, memory/RAM 106, and communication interface 126, can range in sophistication, complexity, and arrangements, and can have several embodiments of connected input interfaces 118 and output interfaces 122.

Figure 2:
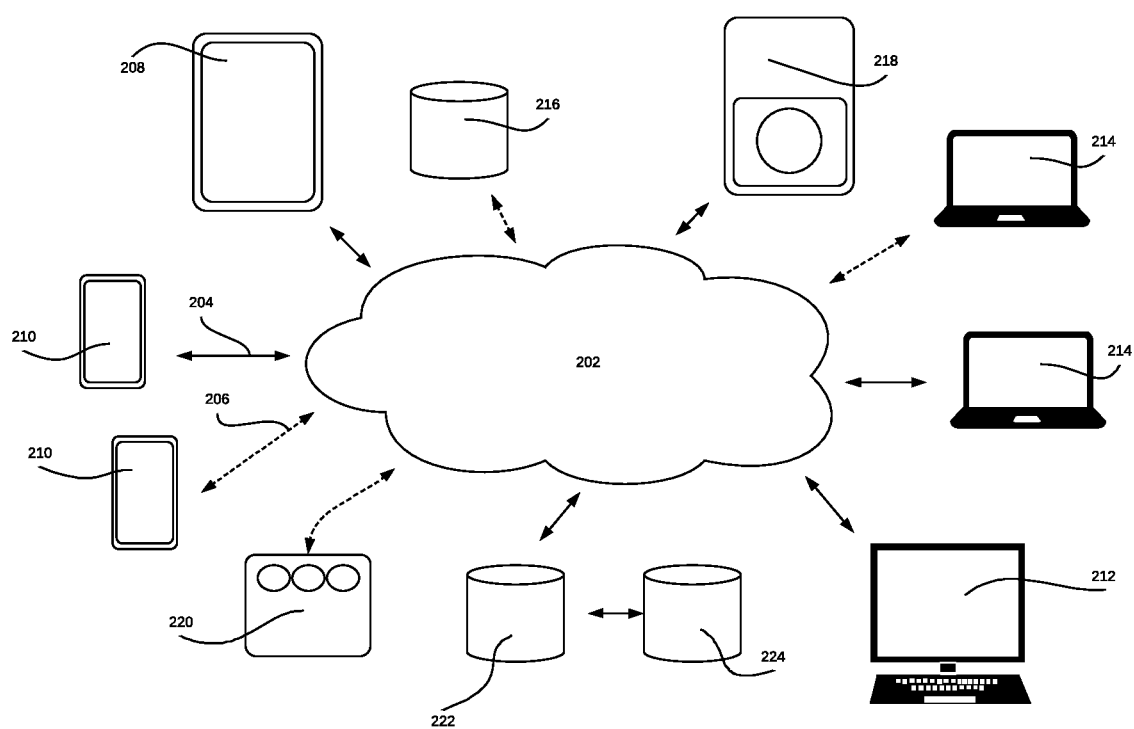
FIG. 2 is an illustration of devices and components working the invention communicating through a network.

FIG. 2 illustrates computing and electronic devices that can access a network on which is also accessible by the computing device 100 which contains the instructions to operate the dynamic digital Kanban board 300. The network 202 can have several different embodiments, including a LAN(s), WAN(s), or distributed network the Internet, among others in any combination to form a network. A computing or electronic device can access the network 202 via a wired 204 or wireless 206 connection. The computing or electronic devices can have many embodiments, including electronic digital tablets 208, smartphones 210, desktop computers 212, laptop computers 214, watches, sound emitting and sensing devices 218 and light emitting and sensing devices 220, wearable devices, VR headsets, digital timers, mechanical devices, among other digital devices with the ability to communicate with the computing device 100. As illustrated in FIG. 2, 222 and 224 is a database connected to the network which can be accessed by the computing device as illustrated in FIG. 1 or any of the devices illustrated in FIG. 2 or the like. The dynamic digital Kanban board user or any computing and electronic device can access the computing device 100 from any remote device or location connected to the network as illustrated in FIG. 2.

Figure 3:
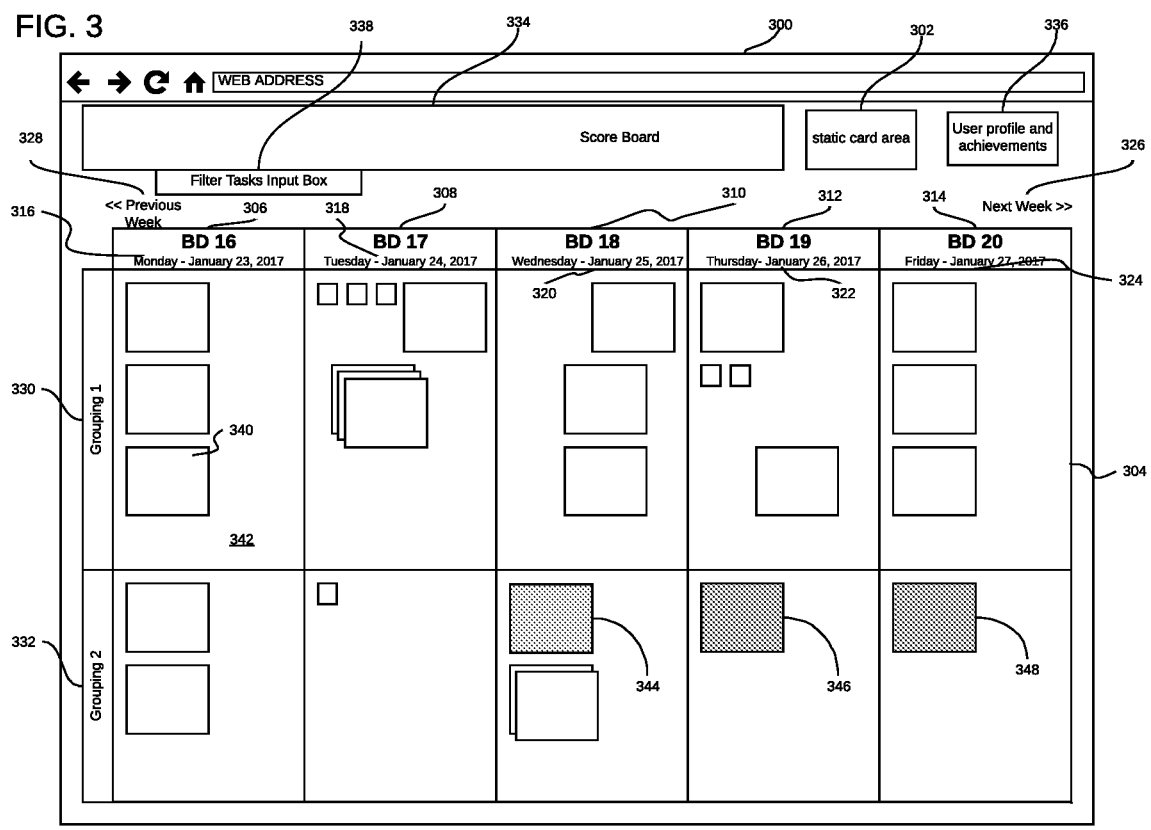
FIG. 3 is an illustration of the invention displaying on a website.

FIG. 3 illustrates one embodiment of the dynamic digital Kanban board displayed through a webpage interface 300, however other interface embodiments could include interfaces local to the user's computer or electronic device. The illustrated embodiment contains one or more static sections 302, a core grouping of sections 304 containing multiple sequentially numbered sections as illustrated by 306, 308, 310, 312, and 314. Other embodiments of sections could include visually distinguishing one section from another with spacing, focus/blurring, size, and color variations, and the like. The sequentially numbered sections are numbered to correspond to the number of business days or open days in a period. The sequential numbering restarts at the start of each period. It is foreseeable that a period could include traditional calendar periods of weeks, months, years, but other embodiments of periods could be set to match work cycles or shifts, semesters, and the like. Each sequentially numbered section associated with a non-standard time unit such as a business day, as shown the illustrated embodiment 306, 308, 310, 312, and 314, and each section secondarily corresponds to a calendar day or date as illustrated 316, 318, 320, 322, and 324. The illustration shows that the section number "BD 16" 306, corresponds the calendar day or date "Monday-Jan. 23, 2017" 316. The illustrated embodiment only illustrates seven sections, but the invention provides for an infinite number of sequentially numbered sections that correspond to calendar days and dates. The invention groups cards in a plurality of sections showing seven or less consecutively organized sections sequentially numbered with the business day or work day that corresponds to the calendar day associated to each section. This embodiment allows the computing device 100 to display a series of sequentially numbered sections that succeed the current section being displayed 326, or sections that precede the current section 328. Each section can be further subdivided into smaller groups as illustrated 330 and 332. The illustrated embodiment contains a plurality sections that are not sequentially numbered including a productivity score board 334, user profile and achievement sections 336, filter task input box 338. Users can create and place cards 340 according to an embodiment of the dynamic digital Kanban board in one of the plurality of sections 342 on the board. Once a user has moved a card to a different section the card will then be associated with and appear in the new section when the dynamic digital Kanban board is rendered or displayed by the devices in FIG. 2. Various modifications can be made to the above disclosed embodiments of the board, sections, and subsections, as well as alternative embodiments of the invention will become apparent to persons skilled in the art and could include displaying the described embodiments in a singular manner or in a joint manner showing all sections and subsections concurrently.

The invention allows for cards to be displayed using a plurality of different methods based on one or several of the card attributes. These methods allow for cards to be displayed in specific groupings, isolating, or regrouping cards based on card data or associations. The current embodiment shows several methods in which to display cards in different sections.

The current embodiment shows that a method of displaying cards associated with a core grouping of sections, in which each section is associated with a business day or work day or available day corresponding to a calendar day. This embodiment of the invention calls this the "Board View" FIG. 3.

The computing device can add cards to any of the plurality of sections by receiving input from a user's input device 120, another device connected to the network 208, 210, 212, 214, 216, 218, and 220, or automatically from information received by the computing device through the network 202 triggered by an external event, email, calendar event, weather event, news event, ERP event, or external database event or the like. If a card is added to a dynamic section in the core grouping of the plurality of sections, each section corresponds to a calendar day and the added card will be associated with the calendar day associated with the dynamic section in which the card was added.

A user can create, place, or move cards in any of the plurality of sections including the sections in the core grouping of sections showing available calendar days or open days or static sections 302 which are not associated with any calendar or open day(s). Once the user creates a card, the user can move the card from or to each section on the board 304, including static sections 302 which are not included in the core grouping of section, to any other section on the board. Users can use input devices to manipulate cards in different views which group and organize the cards in different manners to simplify, organize, isolate, the imputed cards.

Each card 340 associated with a grouping of data elements that relate to a task, reminder, note or the like that requires a user's attention on or by a particular day or date or time. A user can identify when a card requires action by placing the card or moving it to one of the board sections that corresponds to an available calendar day or open day on which the card requires attention. Each section in the core group of sections corresponded to a calendar day, which allows the user to view, sort, organize the cards associated with that calendar day or open day the user for which the user is concerned. The user can review the section identified marked with any specific calendar day and determine all the tasks, reminders, notes and the like that require the user's attention or action on that specific day or date.

Figure 4:
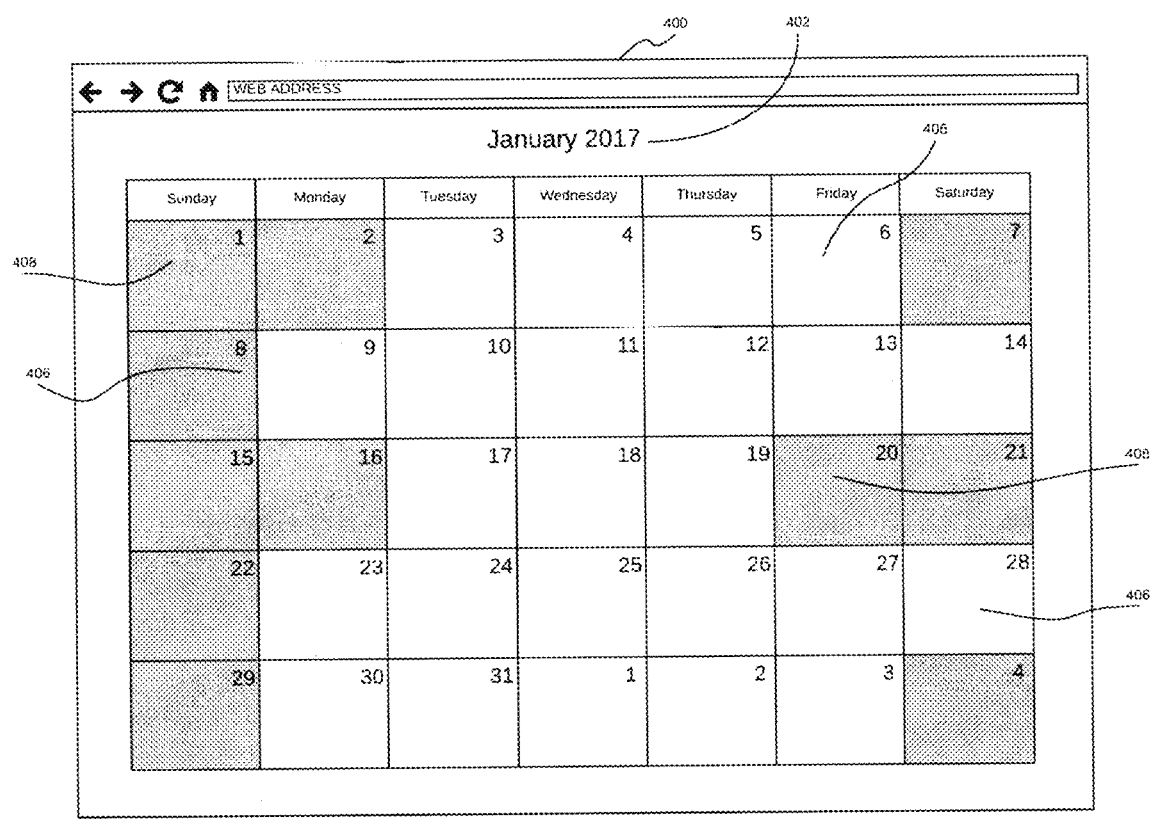
FIG. 4 is an illustration of the portion of the invention displaying the day selection process.

The invention includes a method of selecting days and dates that are considered available and can be associated with each section in the core group of sections in which the user can associate or place cards. this allows the user to exclude holiday and weekends. FIG. 4 illustrates one embodiment of a display which allows the user can select which days and dates the user would like to be considered open to be part of the sequentially numbered sections in FIG. 3 as part of the core grouping of sections. This illustrated embodiment is displayed on the webpage interface 400, displaying only the days in a single month 402 in a calendar format 404. In this embodiment the white calendar days 406 are available or open for display on dynamic digital board 304, and the shaded calendar days 408 are not available and not open to be displayed on the dynamic digital board 304. Cards can only be placed in and moved to board sections that correspond to days or dates that are available or open.

Figure 5A:
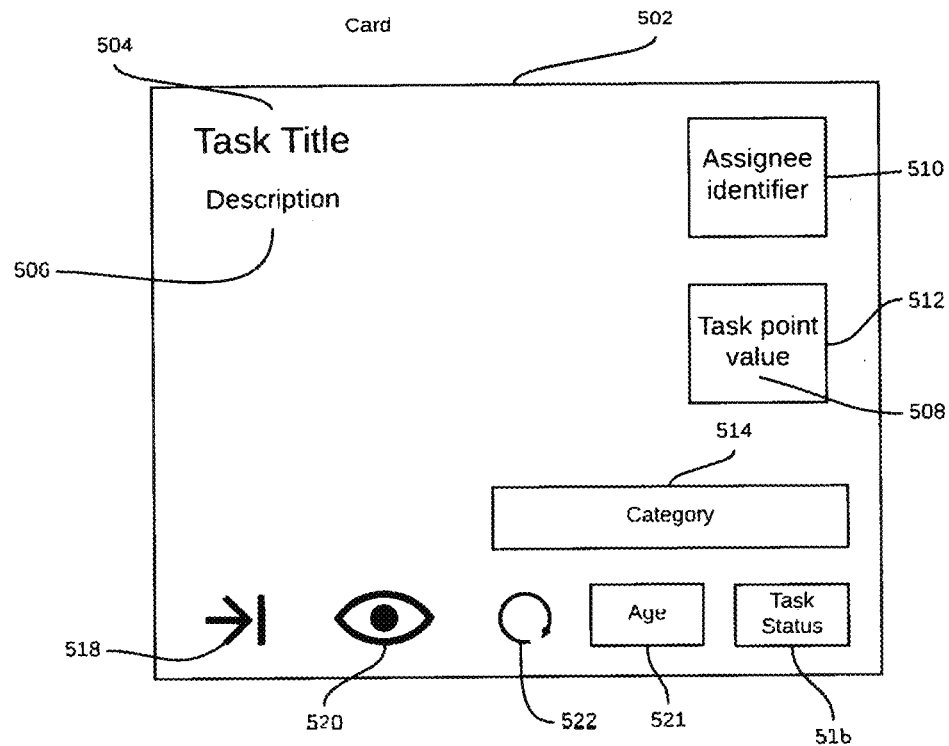
FIG. 5 A is an illustration of the portion of the invention for displaying information relating to an individual task and FIG. 5 B displaying a method of displaying multiple tasks together.

FIG. 5A illustrates one embodiment of a card 502, which is a grouping of data elements relating to a task, reminder, note or the like that requires a user's attention on or by a particular day and date and time. The illustrated embodiment of a card is visually represented in the form of a rectangular or multi-sided shaped object, however, a successful embodiment could have cards represented by a multitude of shapes of different sizes and colors. In the illustrated embodiment of a card visually displays the following data elements, card title 504, card description 506, assignee identifier 510, card point value used as part of the point value calculation 508, card value area 512, card category 514, card status 516, autoflow feature 518, card privacy feature 520, and card recurring feature 522. Other embodiments of the invention can include data elements which include any structured or unstructured data related to a card, internal or externally related data, calculations, value, and machine learning algorithmic calculations.

In the invention embodiment each data element of the card adds value to the process of using the dynamic digital Kanban board. The card title 504 allows the user and other members of the team to identify the particular task, reminder, note or the like. The card is visually displayed as illustrated in 502 the card title 504 is displayed with emphasis or a differentiating feature so that users can read and distinguish cards quickly from one another. When creating a card, the user can add information in the card title field that will be associated only with that particular card and stored in memory, secondary memory, on disk or in a database. All the stored data associated with the card stored in memory, secondary memory, on disk or in a database is not required to be displayed on the card 502. The entirety of the needed task action, reminder, note, or the like may not be fully described and understood from only information displayed in the title of the card, and thus the user is provided additional space to input information associated with the card by inputting information into the card description field 506 and that description will be associated only with that specific card. When the card is visually displayed on the digital board the card's description will also be displayed 506.

As illustrated in this embodiment another data element in the data grouping associated to each card is an assignee or user and an area to represent this data 510. This allows each card to be associated or assigned to a specific assignee. The user can input the card assignee using an input device or the assignee can automatically be determined by a predetermined algorithm on computing device based on the creating user. The card assignee is a data element associated with each card, and in this embodiment is displayed as the card assignee identifier 510 on the front of every card. The card assignee identifier allows the user and team members to quickly identify which cards are most relevant to particular users. The card assignee identifier 510 can be a user's name, symbol, image, or identifying mark which allows one user to be distinguished from another user.

As illustrated in this embodiment another data element in the data grouping associated to each card is a category identifier 514. Attaching a category to each card allows the users to associate each card with a particular relevant category. This allows the user and team members to group, organize, or prioritize like cards together by category. Categories can be created by the user and can range from types of activities such as "phone call" or "follow up" category, or similarities amongst activities "month end close" or "morning" activities. Categories can also be used to for the point value calculation by assigning different categories different values.

As illustrated in this embodiment another data element associated with each card is the card progress status. The card progress status is displayed on the front of each card 516. The card progress status is displayed on the card and represents the current status of a particular card task or how far the particular card task has progressed in the work or productivity cycle.

Common predefined progress statuses are "To Do", "Doing", "Done", and "Later", where a card that needs a user or team member to take action, the card would be in the "To Do" status signaling the user needs to pursue or action the task represented on the card. Once a user or team member begins actively working on the represented task or actioning the card the user would change the card status from the "To do" to "Doing" status. If the user has completed actioning the task for the day, however, the task is still incomplete, the user would change the card's status back to "To Do" from "Doing". Once the user has fully completed actioning the card the user then changes the card status from "Doing" to "Done". When a user changes the card status to "Done" the card's appearance visually changes to allow the user and the team members to quickly identify which cards still need attention and action. The when a card's status is changed by the user from "To Do", "Doing" to "Done" the card visually changes in size, shape, or color, to become visually distinguishable from cards in other status. Any change in card status also can trigger animations, sounds, lights, and calculations and the like on the computing device or other devices.

As illustrated in this embodiment another data element associated with each card is the point value 508. A point value is assigned to every card. The point value can be determined by the user or automatically determined by the computing device. The invention allows for the point value to be impacted by associated card data, time, or information from external sources. The point value is displayed on the card in the point value area 512 and can be displayed individually or in aggregate in other places on the dynamic digital board. The card point value is used for the board point value calculation and this embodiment for the Score Board calculations FIG. 13.

As illustrated in this embodiment many types of data can be associated with each card and stored in memory, secondary memory, on disk or in a database accessible by the computing device. In this embodiment, additional data elements associated with each card include a Boolean indicator if the following behavioral card features are enabled or disabled: the autoflow feature 518, the card privacy feature 520, card aging feature 521, and the recurring card feature 522. Various modifications of the disclosed embodiments as well as alternative embodiments of the invention of card behaviors which include any stored algorithm or set of computer instructions that could change the data associated with a card or the card's behavior, point value, or the like.

Figure 5B:
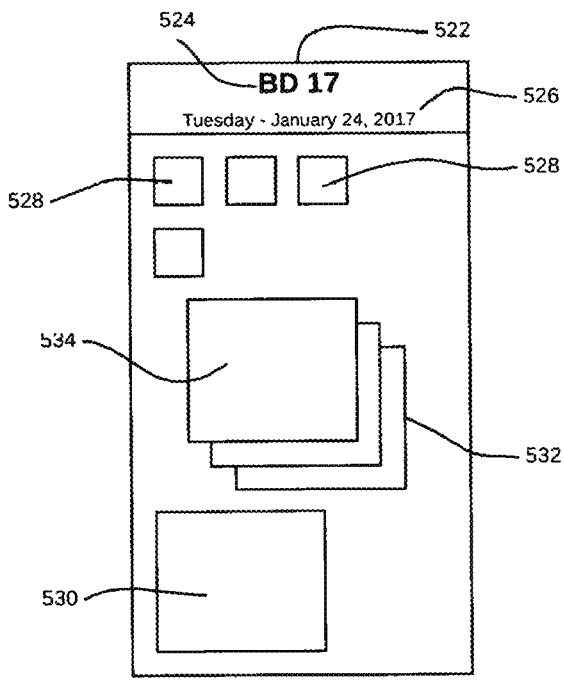

FIG. 5 B illustrates one embodiment of a card displayed in an individual section of the Board View 522. The Board View section is sequentially numbered 524 and associated with a specific calendar day and date 526. The illustration shows that one embodiment of the invention displays cards in different status differently. cards in the "Done" status or cards that require no further user action or attention are displayed as smaller quadrilaterals with differentiating colors and other differentiating features 528, and dynamic cards that continue to need a user's attention or action are displayed as normal quadrilaterals displaying selected card associated data 530. cards can also be organized in an overlapping fashion or a stack 532, displaying only the card's associated data on the front most card 534, which is illustrated in more detail in FIG. 8.

The invention provides that the user changing the status of any card triggers the event details to be stored into the database, notification information to be transmitted over the network to a different user or different computing device, an email being transmitted, a text message being transmitted, including information being sent to other light and sound output devices, wearable devices including VR headsets, and to a computing device to perform a scoring calculation.

Figure 6:
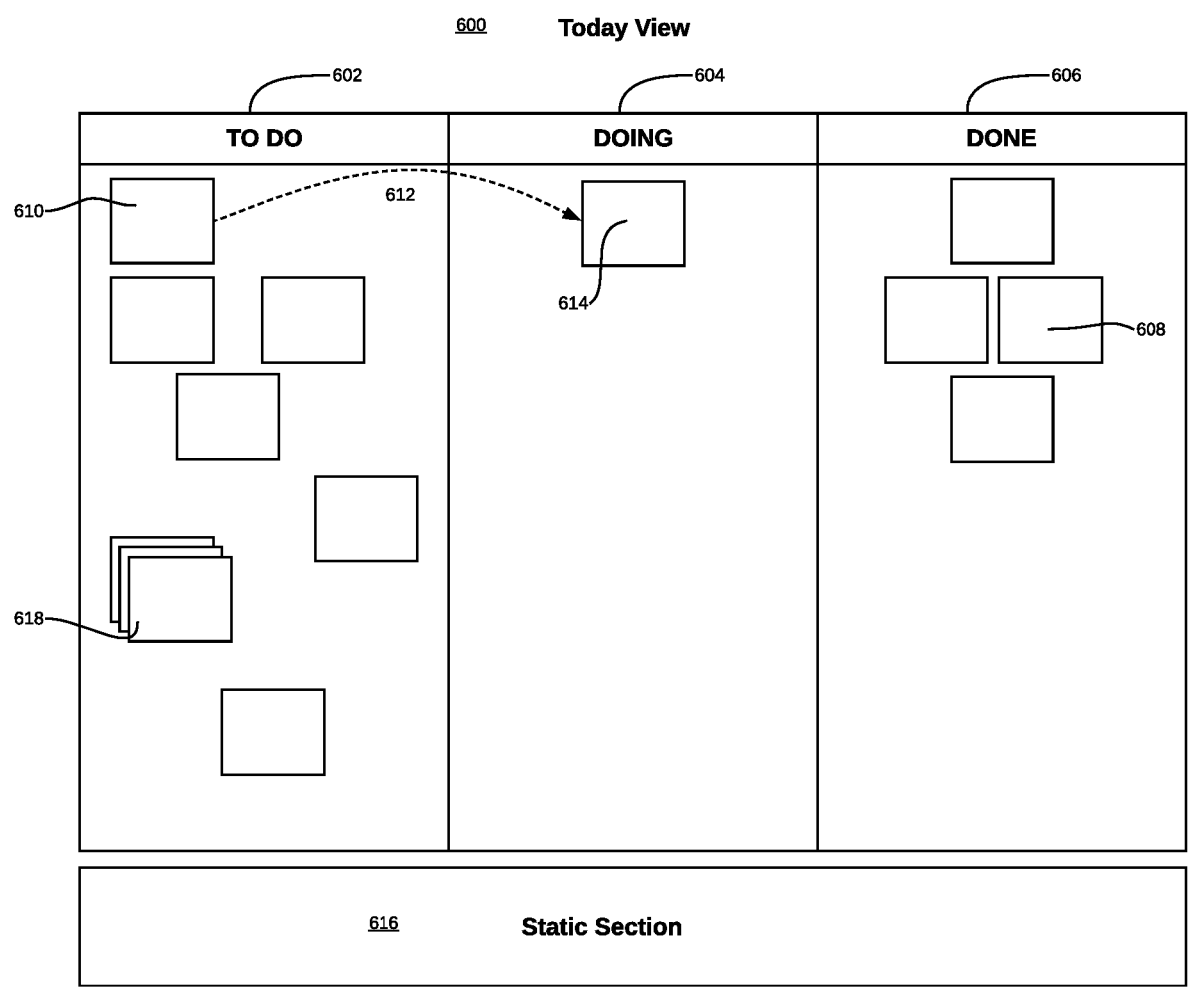
FIG. 6 is an illustration of the portion of the invention for displaying information relating to an individual section relating to an individual day and information related to a card stack.

FIG. 6 illustrates the Today View embodiment of a method of the invention for displaying cards 600 in a core grouping subsection. the Today View which is an isolated view that only displays cards from a single core grouping section from the Board View associated with a particular date, day or time as shown in FIG. 3 in a subsection. The board is capable of displaying cards in different groupings by organizing, ordering, excluding, prioritizing, and sorting cards into different sections. The Board View FIG. 3 displays a core grouping of cards displayed in sequentially numbered sections, with each section associated with a specific day and date and time. The Today View FIG. 6 allows all the cards associated with and appearing on a specific core grouping section or day to be displayed independently in a subsection without displaying cards associated with any other core grouping section or day from the Board View 600. The Today View is an isolated display of all cards in a particular subsection, cards associated with different day or date will not be displayed.

In the Today View, cards are grouped into individual subsections determined by the card's status and each section will display cards all cards with a particular status. The invention allows for a plurality of different active progress card status statuses. In this embodiment there are 3 progress card statuses, all cards in the "To Do" status will appear in the "To Do" section 602, while all the cards in the "Doing" status will appear in the "Doing" section 604, and cards 608 in the "Done" status will appear in the "Done" section 606. cards in the Today View may also be organized in card stacks 618.

In the "Today View" an input device can be used to move the cards 610 from one status subsection to another status subsection. When a card is moved 612 to a new status subsection the card's status will update to match the status of the status subsection in which the card was moved to and the card will become associated with that new status 614 and the change will be saved in computer-accessible memory 108. Initially, the card 610 was associated with status "To Do", and after being moved to the "Doing" subsection 604, the card 614 is now associated with "Doing" status and "Doing" subsection. The invention allows that regardless of card status 602, 604, or 606, the card will only be associated with and display in that particular core grouping section on the Board View FIG. 3, which will result in the card still being associated with a particular day when the cards are displayed in the Board View FIG. 3 rather than the Today View. The invention also allows for the Today View to contain sections that are not associated with a particular active status or day or date or time which is called in this embodiment a Static Section 616.

Figure 7:
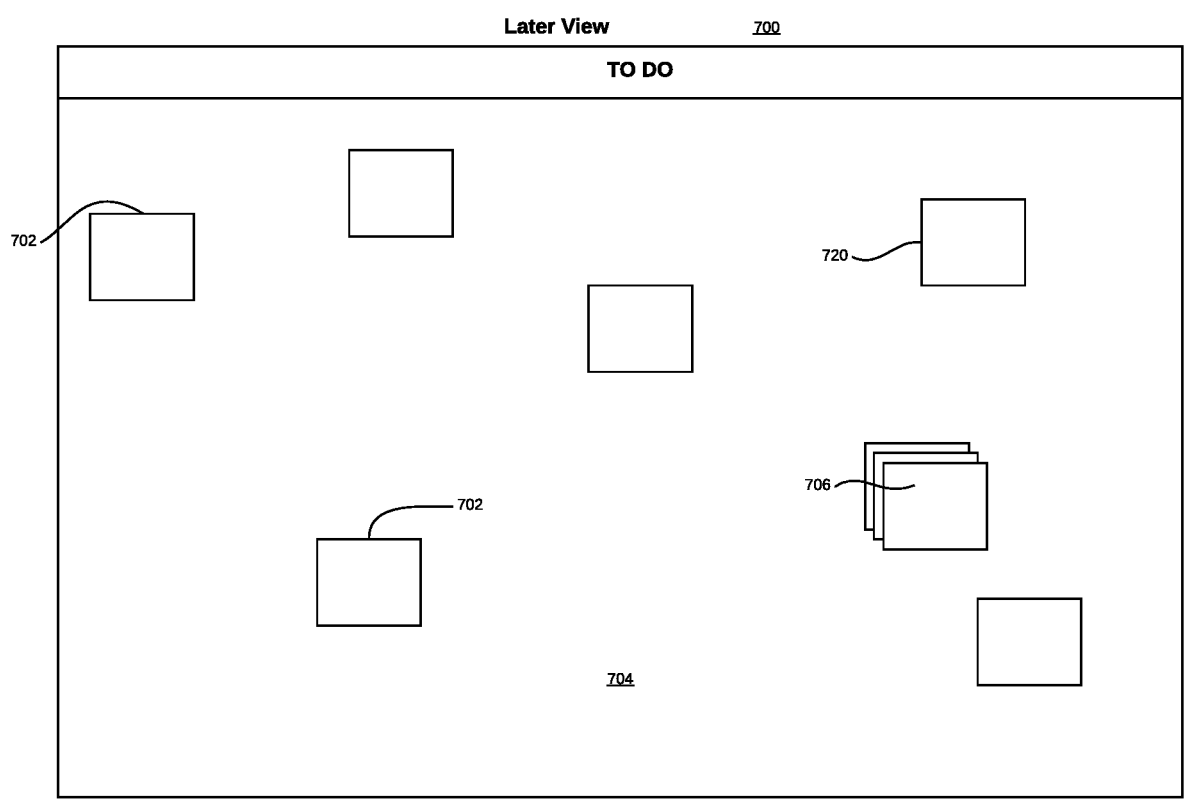
FIG. 7 is an illustration of the portion of the invention for displaying cards relating to a static section.

FIG. 7 illustrates a static section, an embodiment of the invention which allows cards to be displayed that not associated with a business or work day or calendar day and do not correspond to any specific and are not associated with any active progress card status. These sections are used for displaying cards outside the normal working set of cards. Cards in these static sections will not be associated with any particular business day or work day section. This embodiment of the invention calls this method of displaying cards Later View 700. The Later View will display cards 702 that are not displayed in the Board View (sections and cards are associated with a specific day) or the Today View (cards displayed associated with a specific day and grouped by card active progress status). The user can organize and prioritize cards within the Static Section 704 including using card stacks 706. The user can move cards to the Static Section using an input device to move the card from Board View or Today View section to the Static section or by changing the card status to "Later" status. A user can move a card from a Static Section to Board View section or to a Today View section by using an input device to move the card to the desired section making the card associated with a specific day and the card or by changing the card's status to an active status.

Figure 8A:
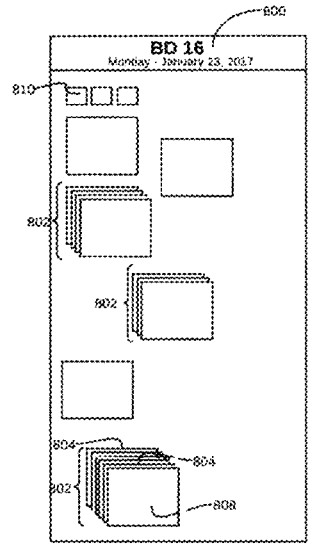
FIG. 8 A is an illustration of the portion of the invention for displaying a card grouping called a stack and FIG. 8 B is a method for displaying dynamic sections associated with card status relating to a single card stack.
Figure 8B:
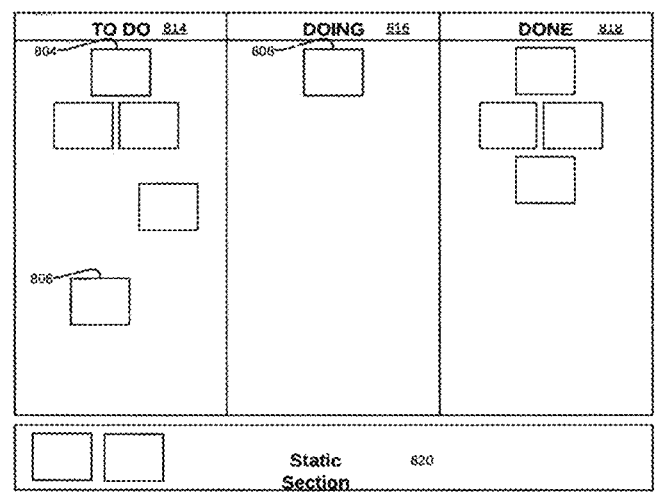

FIG. 8 A illustrates the embodiment of the invention that allows users to organize, reorganize, filter, sort and group cards within specific sections 800. Users can move cards into common groups of cards to create a "stack" of cards 802. These stacks allow users to group cards together that are related. Dynamic digital cards will be organized in the stack by the order in which the cards need attention or action by the user, with the cards that need action or attention first on the top of the stack (the front most card) 804 and the cards that need attention or action last is placed last in the stack 806. In this embodiment, one card in the stack is "Doing" status and appears as the first card on the stack 808. In this embodiment if a card in in "Done" status and no longer needs attention or action by the user it will not appear in the stack in the Board View or the Today View, however, cards in the "Done" status may appear in other areas of a section in the Board View 810 or Today View. Additionally, the invention allows for cards that are included in the stack but are in the "Later" status or have been moved to the Static Section, will not appear in the card stack, but may appear in the Static Section in the Board View FIG. 3, Today View FIG. 6, Later View FIG. 7 or Stack View FIG. 8 B.

FIG. 8 B illustrates the embodiment of the invention that organizes all the cards associated with a stack by card status in sections associated with each individual active card status. The user can view the cards grouped in particular stack in the Stack View 812. The Stack View will only display cards grouped in that stack and in this embodiment the cards are displayed in sections corresponding to each card status 814, 816, and 818. In this embodiment the Stack View cards will be displayed top to bottom in the order in which the cards need the user's attention or action. A user can label stacks and move an entire stack to a new section. A user can move cards associated with the stack, but the user does not want the card associated with an active card status or a sequentially numbered section to the Static Section 820, the attributes of the card will change to match the section of board to which the card was moved.

In addition to card's data elements which are descriptive in nature, the invention provides for users to associate cards with behaviors, or stored algorithms or instructions, which can cause cards to behave, appear, function, interact, cause notifications, or impact the point value calculation in different ways.

The invention allows for the computing device to store instructions in the secondary memory or a database that relate to appearance and data elements of cards and for these store instructions to be executed by the computing device when specific events occurs. The execution of these stored instructions allows the computing device to change attributes and data associated with a card to change without user input. In addition to impacting the card's appearance and associated data, these executed stored instructions can create events that trigger notifications, impact the point calculations, and create additional cards. The invention provides for the board and the cards to update dynamically based stored and executed instructions. The computing device saves every event related to the board and cards in secondary memory or in the network connected database and each saved event can trigger other additional computing actions or events.

Figure 9:
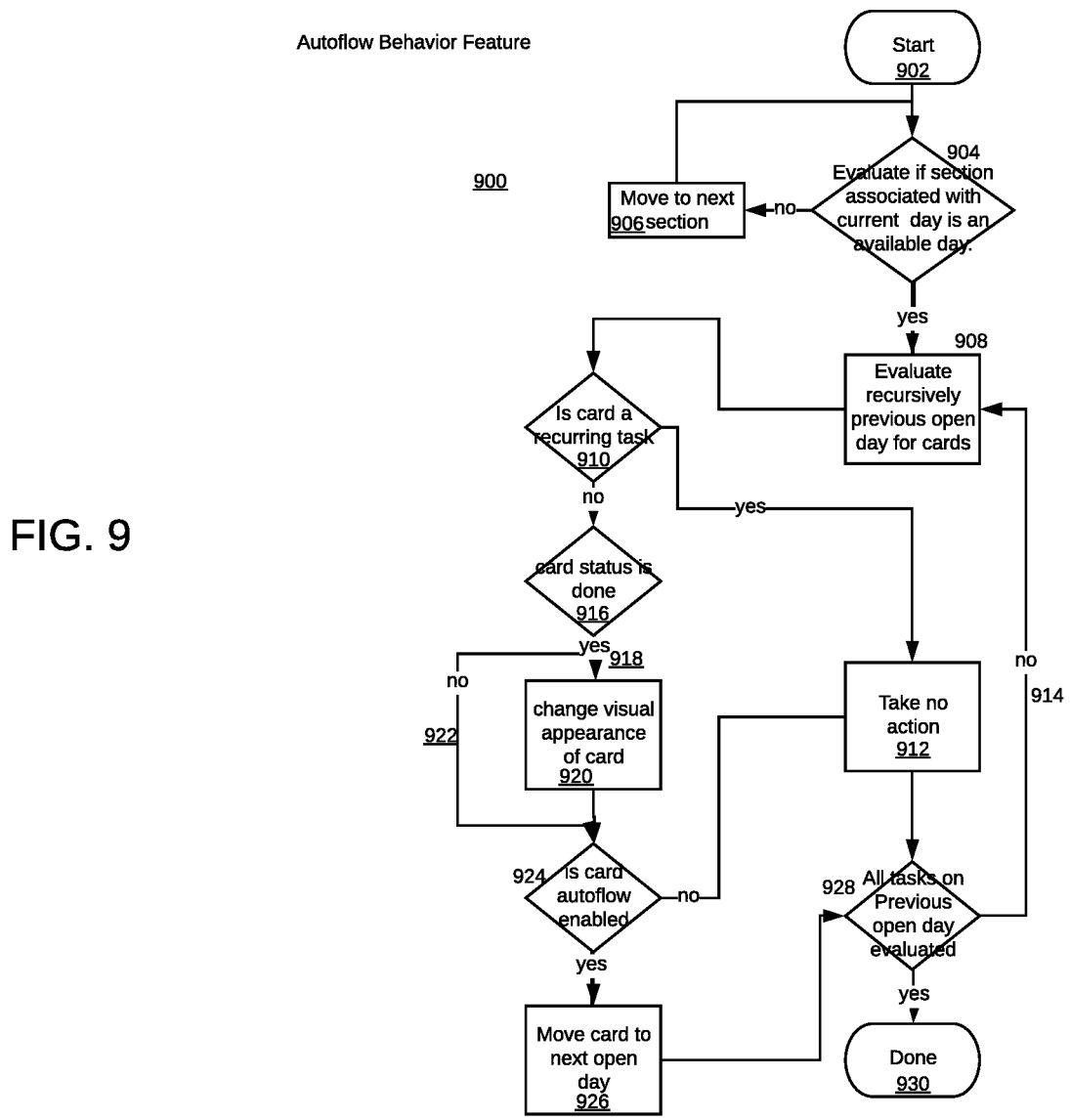
FIG. 9 is an illustration of the portion of the invention's logic for evaluating and managing tasks within the invention.

FIG. 9 illustrates one embodiment behavior card element in which cards automatically move from one sequentially numbered section to a subsequent sequentially numbered section without user input 900. This behavior is called Autoflow. The computing device starts 902 by evaluating if the section associated with the current calendar day is an available or open day or date 904. If the section associated with the current day is not available or open, the computing device evaluates the next section to determine if the calendar day is available or open 906.

Once the computing device determines that the section associated with the current calendar day is available, the computing device begins to recursively evaluate cards in sections associated to previously available and open days 908. First, the computing device evaluates if the card is a recurring card 910, if the card is a recurring card the computing device takes no action 912 and the computing device continues to recursively evaluate the cards from the previous open day 914. When evaluating the cards from previous sections associated with available or open days, if the computing device determines the card is associated with "Done" status 916 and 918 and then the computing device changes attributes and visual appearance of the card 920. If a task associated with a previous day and is associated with a status other than "Done" 922, the computing device will check if the Autoflow behavior feature is enabled 924. If the cards Autoflow behavior feature is enabled, the computing device will update to the card's day association to equal that of the current day or the next open future day and display the card to the section that is associated with the current day or the next open future day 926. If the computing device determines that a card's Autoflow behavior feature is not enabled the computing device will take no action 912 and will continue to evaluate cards associated to sections associated with the previous available or open days 908. Once the computing device has evaluated all cards associated with the previous available or open day the computing device 928 will stop the Autoflow instructions 930.

If the Autoflow behavior is enabled on every card, this complete usage will prevent any non-recurring card from being associated with a status other than "Done" from being associated with any section associated with a previous or past day and all cards with statuses "To Do", "Doing", "Later" displaying in the subsection associated with the current day or further day. This prevents the user or team member from manually moving or dragging all cards that are not in "Done" status to from a section associated with a past day to the section associated with the current open day. A card with Autoflow behavior feature enabled will move indefinitely to the section associated with the current day until the user or team member changes the card status to "Done". This insures that all cards that have a status other than "Done" will appear in the section representing the current day. If the user doesn't not complete a task by changing the card status to "Done" the card will move indefinitely to the section corresponding to the current day reminding the user that some action needs to be taken with the card.

If the Autoflow behavior feature is not enabled, the cards will continue to be associated with the day and section as originally set or manually updated by the user and the computing device it will display on the Board View cards associated with all statuses in sections associated with previous days.

Figure 10:
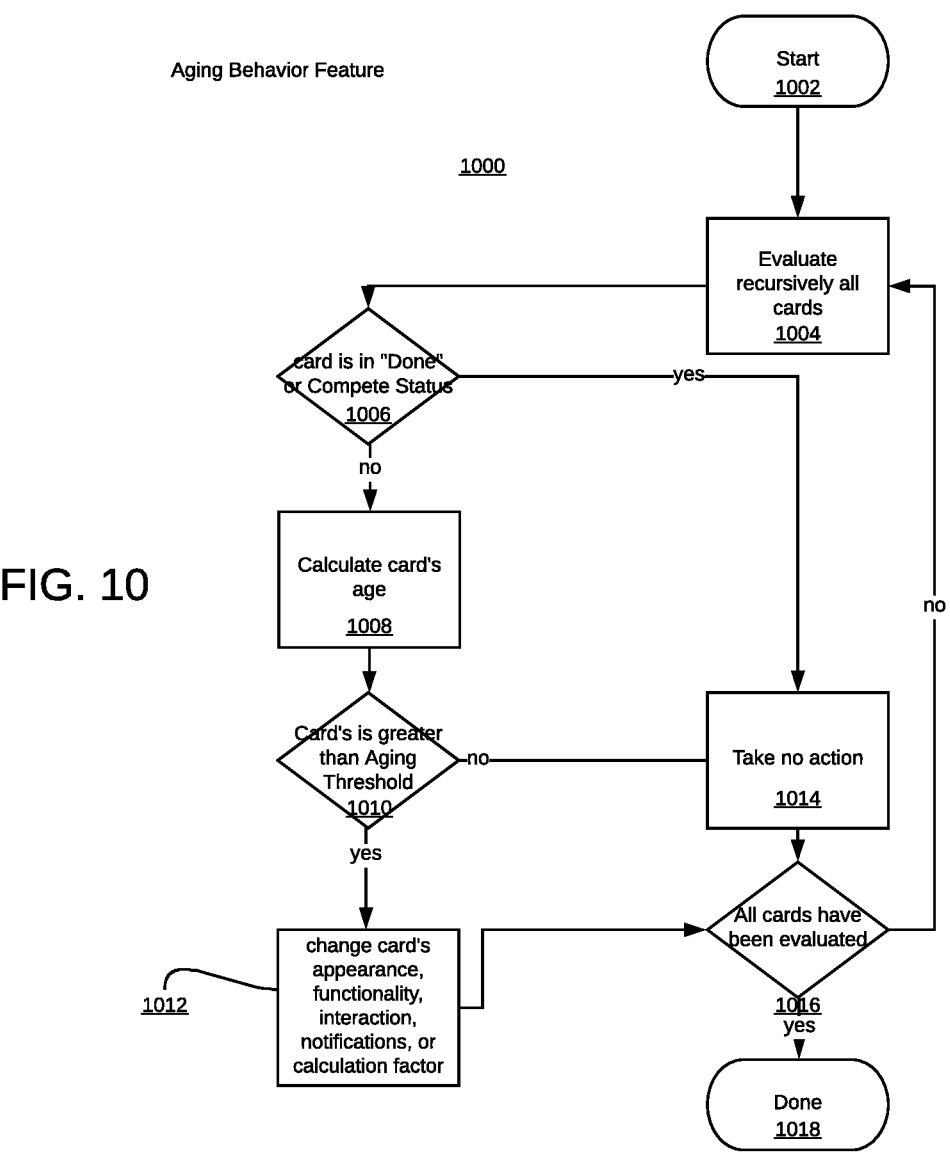
FIG. 10 is an illustration of the portion of the invention's logic to evaluate a card's age.

FIG. 10 illustrates another embodiment of the card behavior which measures the card's age against an aging threshold and then executes instructions to change the card's appearance, functionality, interaction, notifications, or point value calculation factor, and the like.

FIG. 10 illustrates a simple embodiment of the Aging Behavior feature 1000. The computing device starts 1002 the process by recursively reviewing each card evaluating the card's status 1004. If the computing device determines that the status associated with the card is "Done" 1006 the computing device will take no action 1014 and continue to evaluate the next card 1004. If the computing device determines that the status associated with the card is not "Done" 1006, the computing device will calculate the age of the card 1008 and compare the card's age to the aging threshold 1010. If the card's age is greater than the aging threshold, the computing device will change the card's appearance, functionality, responsiveness, notifications, or point value calculation factor 1012. If the computing device determines that the card's age is less than the aging factor it will take no action 1014 and evaluate the next card 1004.

In the current embodiment, the card threshold is set by the number of business days from the date of the card's associated section in the core grouping of sections on the main board. The computing device will calculate amount of time between the date of the card's first associated section and the current business day, however, other embodiments could use other dates and times such as last card action date and time, dates and times determined from external actions or the input or actions of other users or automated process, such as the number of times a card has been changed status or moved to different sections associated with different days or non-standard units.

The aging threshold can be determined by the card's category, card's priority, card's complexity, external inputs, or other factors such as number of cards a team or user currently is assigned. In this embodiment if the card aging is greater than the aging threshold, the card will change in appearance with different coloring, sizing, and presentation when displayed on the board. The change in appearance will easily allow the users to visually distinguish between which cards have exceed the aging threshold and which cards have not.

Additionally, in this embodiment a notification can be sent to the card owner regarding the age of the card and the calculation factor will change providing the users with different incentives to action the card now that the card's age has exceed the aging threshold. The purpose of the Aging Behavior is to encourage users to take action related to cards sooner rather than later.

Another embodiment of card behavior is automatic card creation according to a particular pattern or schedule inputted by the user to create recurring cards. A user can create a multitude of similar cards associated with future sections or days. This particular invention allows users to create recurring cards according to user designated patterns or schedules. In this embodiment the user may create recurring cards in future sections or future days associated with days of the week, weekly recurring cards. In this embodiment the user could select for a card to be recreated every Tuesday, which would create a card in every future section or future day associated with a Tuesday. The user is not limited to a single day of the week and can select multiple days of the week as well.

Another embodiment of the creating recurring cards is to allow the user to create recurring cards associated with future sections or future days based on the particular work days (also known as business days) or available days of each month. This would allow the user to create a recurring card on the 3rd work day or available day each month. The user can select one or multiple recurring future work days or available future days for the created recurring cards to appear. FIG. 3 displays the embodiment of a recurring card associated with work day 18 334, work day 19 336, and work day 20 338.

Additionally, with any type of recurring card creation, the user can select an end date to which no recurring cards will be associated with future sections or future days beyond the end date input by the user. The end date can be determined by an actual date or by a set number of card recurrences in which the number of recurring created cards will not exceed.

Another embodiment of card behavior is allowing cards to be marked as private or restricted to a specific user or dynamical digital card owner. For the allowed user or owner, the card will be displayed on the dynamic digital board as any other non-private or non-restricted card. However, for users other than the allowed user or card owner all attributes of the card will not be transmitted to computing device or any other electronic device and the card will appear as an empty static digital card and displayed without any card attributes representative of a private or restrictive card with information that is unavailable.

A specific user or card owner may allow other users access to a private or restricted card at which point the card data will be transmitted to the computing device or other electronic device and the card will appear in the form and substance and include all attributes as created by the specific user or card owner. The invention provides for the computer to make point value calculations using inputs from event occurrences, which include the changing or creating of a card's attributes or many cards' attributes and measuring the elapsed time between or after card events or reviewing the absence or presence of a card event. The invention allows for the computing device to store in memory, secondary memory, or database information regarding time, date, duration, frequency, event name, user, point value, priority, status, complexity, day of week, card visibility and the like related to every card event and to make calculations based on the stored information and machine learning algorithms and external data and for the computer to update the board with additional information which may impact the board or a card's color, shape, position, or associated grouping of information, scoring calculation, notifications, or the like.

The invention provides for the computing device to make calculations, store the calculation results in the memory, secondary memory, or database and aggregate a plurality of calculations, and compare calculations or the aggregated total calculations to a target total and store the aggregated result and target comparison in the memory, secondary memory, or database.

The calculations can be based on a plurality of factors, taking into account a single or a plurality of card attributes, events, user behaviors, machine learning algorithms, or external data and events when making the calculations. The invention includes a plurality of calculations relating to card events, which have varying importance to different users, allowing users to impact and modify or influence the calculations. One user may focus on calculations related only to events relating to the difference between card events directly related to changes in card status (i.e. card status moving from "To Do" status to "Doing" or "Done" status), or the amount of time elapsed between the card event showing a card's status moved to "Doing" status and when the card status event shows the card moved to "Done" status. Other users may be more focused on actioning cards that have the highest priority or cards that are associated with a particular category and desire calculations that focus on those specific calculations. Other embodiments of the invention could include calculations that measure a user's or group of users' behaviors, card movements between sections, event sequences, start times, and durations, card attributes relating to other card events and user behaviors, and frequency of user behavior or card events.

Figure 11:
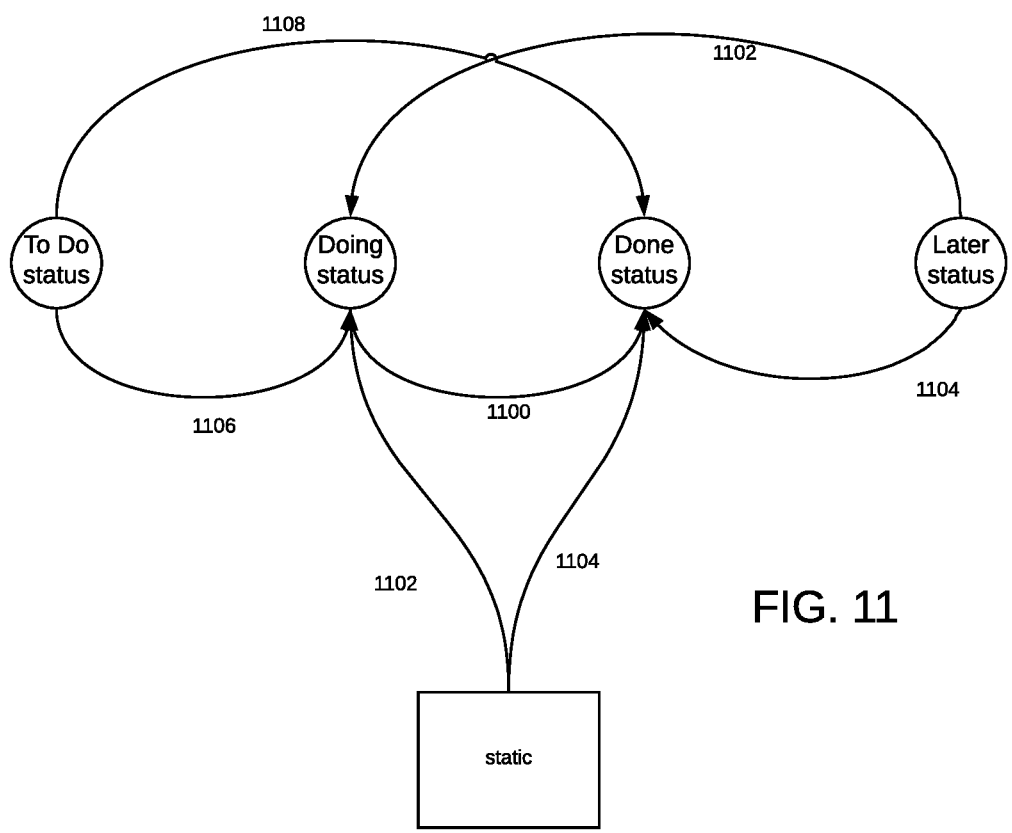
FIG. 11 is an illustration of the portion of the invention's logic to calculate card status changes with positive impact on point value calculations.

FIG. 11 illustrates card status changes. The invention allows the point value calculations to be influenced by behaviors to positively or negatively impact the scoring calculations. In the current illustration several behaviors are represented that positively impact scoring calculations, which include:

Movement of a card from the "Doing" status and ending in the "Done" status 1100;
Movement of a card from the "Later" status or from the static section to the "Doing" status 1102 or "Done" status 1104;
Movement of a card from the "To Do" status to the "Doing" status 1106 or the "Done" status 1108;
Movement of a private or restricted card from the "Doing" status into the "Done" status with one or more allowed users;
Movement of a private card from "Doing" status to "Done" status with a single user;
The priority of card and related events;
The complexity associated with a card and related events;
The card completion, moving to the "Done" or final progress status, under the estimated time;
The consistent or early card completion, moving to the "Done" or final progress status, based on an estimated time;
The comparison of the first card movement of each day compared to a desired start time;
The comparison of the last card movement of each day compared to a desired end time;
The minimization of the average aging period;
The use of recurring cards;
The use of card stacks 802; and
The frequency and consistency of user behavior and card events occurrences; and, among other behaviors that could positively impact calculations.

Figure 12:
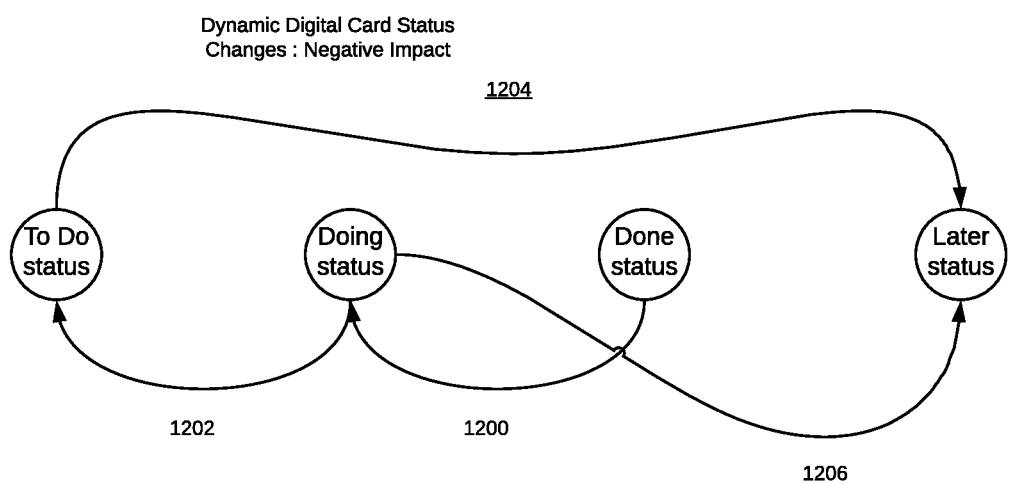
FIG. 12 is an illustration of the portion of the invention's logic to calculate card status changes with negative impact on point value calculations.

FIG. 12 illustrates card status changes which negatively impact the point value calculation. In the current embodiment behaviors which negatively impact the score calculation include:

Movement of a card from "Done" status to "Doing" status 1200;
Movement of a card from "Doing" status to "To Do" status 1202;
Movement of a card from "To Do" status to "Later" status 1204 or to a static section;
Movement of a card from "Doing" status to "Later" status 1206 or to a static section;
A card has received no action from a user for a number of days, and the said number of days exceeds the dynamic digital board's number aging threshold shown FIG. 10;
A card has reached the maximum number of movements and has begun to age as illustrated in FIG. 10;
A card is still in the "To Do", "Doing", or "Later" status when the dynamic digital board's end date has been reached;
A card remaining in a particular status during non-business hours, school, or available hours; and,
The number of cards remaining in a particular status after a desired time.

The invention includes a plurality of methods to calculate each user's or a group of users' aggregate productivity or point value calculation. The aggregate point value or productivity can be calculated in a plurality of ways, calculations include:

Summing the number of cards created or with an initial event;
Summing the number of cards in the "Doing" status;
Summing the number of cards in the "Done" status;
Calculating the frequency and consistency of the use of subtasks or card stacks;
Calculating the frequency and consistency of the use of comments;
Calculating the number of card events associated with different users;
Calculating the average time between the initial event occurrence time and type for a specific measurement period;
Calculating the average elapsed time between a card's initial associated event and the final associated event;
Calculating the frequency and consistency of a user's visits to the dynamic digital board and the frequency and consistency and type of event occurrences related to a specific user;
Calculating the frequency and consistency of recurring cards were moved to the "Done" status;
Calculating the frequency and consistency cards were moved from "Doing" status to "Done" status;
Number of cards where a user has completed an item or multiple items on a subtask list; and, Calculating the aggregate activity for an individual user, groups of users, entire teams, types of users based on occupation or work completed, or predictive activity based on stored data, machine learning algorithms, or external data for the same.

Figure 13:
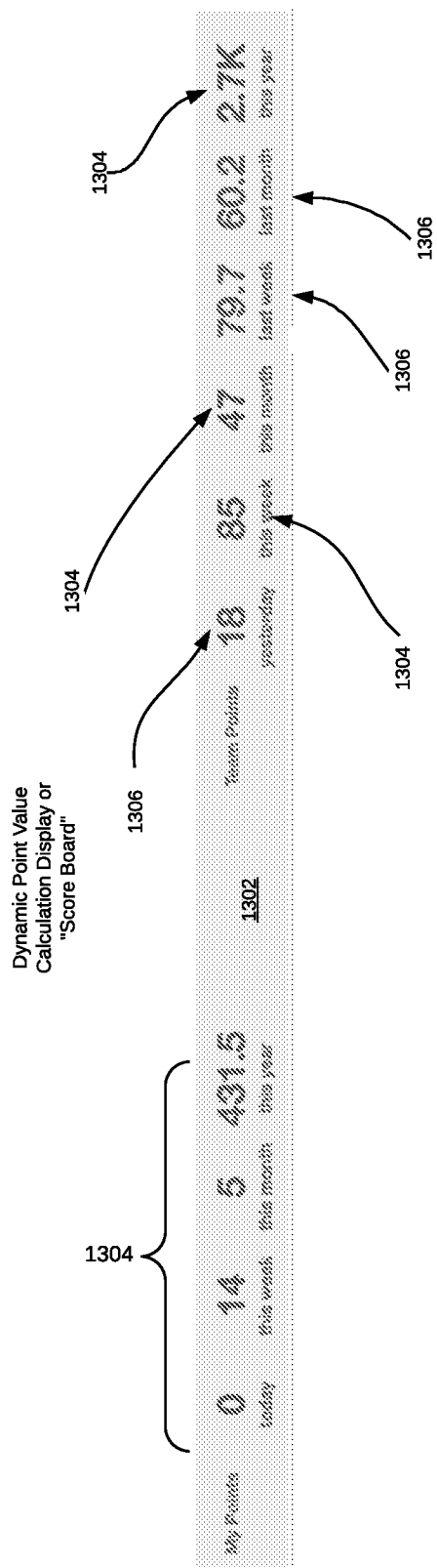
FIG. 13 is an illustration of the portion of the invention displaying a dynamic calculation display or "Score Board".

FIG. 13 illustrates a dynamic calculation display or "Score Board". The invention includes a dynamic point value calculation display or "Score Board" showing the results of real-time point value calculations included in the invention 1302. This embodiment includes the following dynamically displayed real-time point value calculations:

Point value calculations relating to the current period day, week, month, and year 1304;

Point value calculations relating to the previous period day, week, month, and year 1306;

The invention includes storing the comparative calculation as it relates to a specific user or multiple users and allowing users or groups of users to create and store calculation targets for each calculation. The computing device after every calculation will compare the calculated total to the user stored calculation target or goal. The computing device will store the resulting comparison calculation in memory, secondary memory, or the database and send notifications related to the resulting comparative calculation, update the dynamic display, or trigger the computing device to make additional calculations based on the stored information and machine learning algorithms and to update the board with additional information which may impact the board or a card's color, shape, position, or associated grouping of information, scoring calculation, point values, or the like.

Figure 14A:
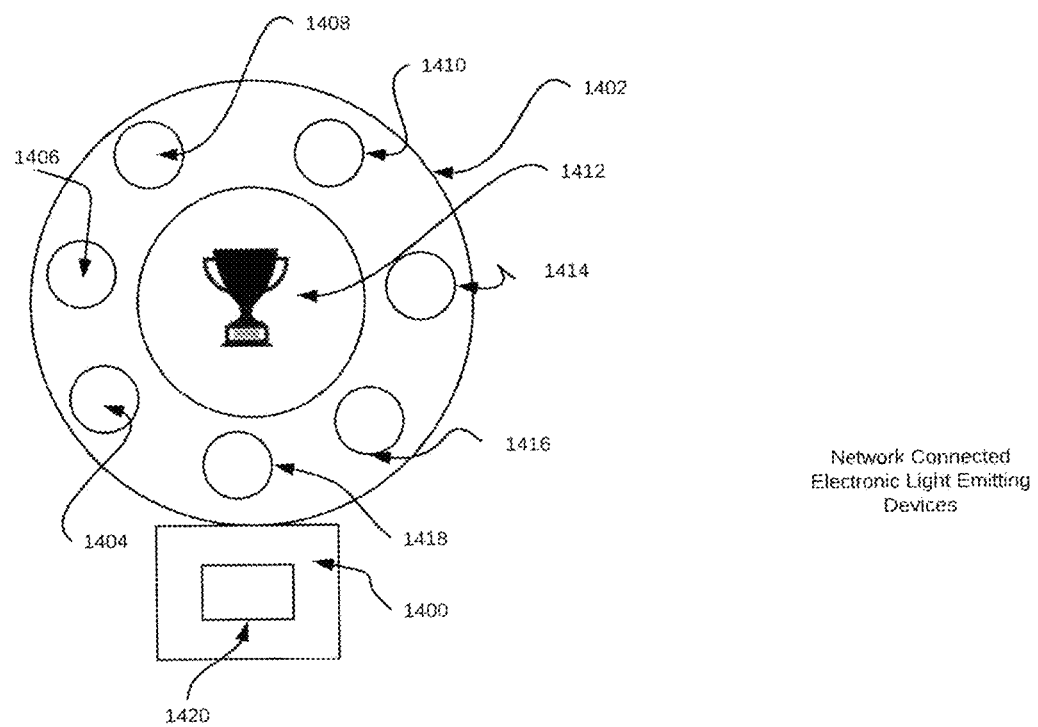
FIG. 14 A is an illustration of a network connected electronic device screen with virtual or digitally represented sequential light images in a circular configuration, FIG. 14 B and FIG. 14 C illustrate a network connected electronic light emitting device with light emitting diodes in a horizontal configuration.
Figure 14B:
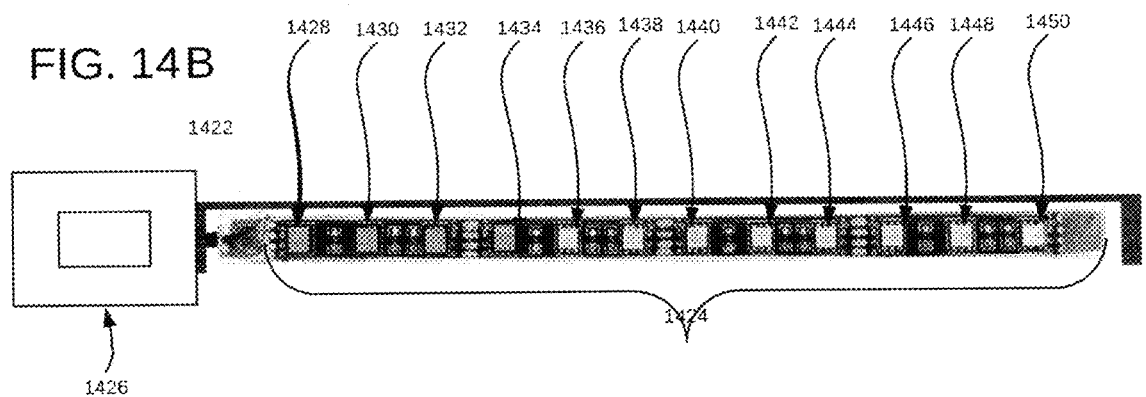
Figure 14C:
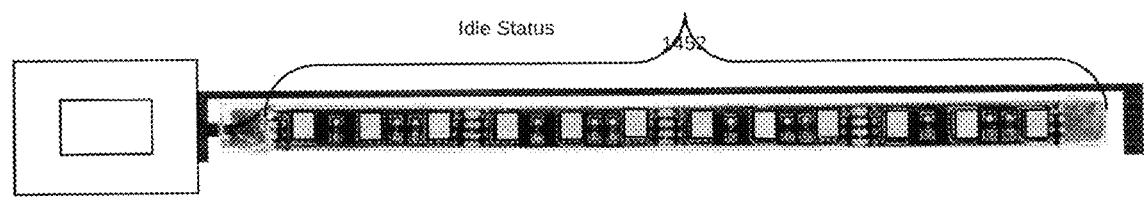

FIG. 14 A illustrates a network connected electronic device 1400 screen 1402 with virtual or digitally represented sequential light images in a circular configuration 1404, 1406, 1408, 1410, 1414, 1416, 1418 with a central graphic or image showing a badge or reward 1412 and sound emitting device 1420. As the user or user's score calculation increases lights 1404, 1406, 1408, 1410, 1414, 1416, 1418 would visually light up or change from one color to another in a sequential manner starting with 1401 and ending with 1418. If the user or user's point value calculation decrease the lights could turn off change from one color to another color in reverse order in reverse order. The network connected electronic device 1400 would receive digital notifications from the computing device 100 and would store the instructions in readable memory. The network connected electronic device would execute the instructions and display the desired light and image desired.

FIG. 14 B illustrates a network connected electronic light emitting device 1422 with a number of light emitting diodes in a horizontal and linear configuration 1424 containing a sound emitting device 1426. Other embodiments include multi-colored light emitting diodes, configurations that are circular or polygonal in nature, and have light emitting diodes arranged in non-linear formats. The computing device 100 sends digital notifications to the network connected electronic light emitting device with instructions for each light including if the light should be turned on, the hue of the light, and the luminosity of the light to reflect the user or user's point value calculation increase or decrease. Additionally, as the score increases the computing device 100 sends instructions to the network connected electronic light emitting device 1422 to emit a sound, providing the user or users with auditory feedback that the score has increased.

FIG. 14 B illustrates that the network connected devices received instructions to turn on light emitting diodes 1428, 1430, 1432, and 1434 with a green variant hue. As the computing device calculates an increase in the user or user's point score calculation, as described herein, the computer device sends instructions for an additional light emitting diodes to turn on with a green variant hue. In this embodiment, light emitting diode 1436 would turn on and be visible to the user or users. Additionally, the computing device would send instructions for the network connected device to emit a sound clip of people clapping. The user or users would receive a visual indication that the score has increased. This is a simple embodiment, other embodiments include any number of patterns or methods used to manipulate the light emitting diodes to provide the user or users with visual, this could include light emitting diode tuning on with varying luminosity, hues, frequency, or patterns and any number of different sounds.

The network connected electronic light emitting device 1422 can also receive instructions from the computing device 100 on general board status, such as amount of activity or inactivity currently occurring on the user or user's board. FIG. 14 C illustrates the same device as embodied in FIG. 14 B however illustrating an embodiment of instructions from the computing device displaying user inactivity on the digital board represented by all of the light emitting diodes on the network connected light emit to orange hue and limited luminosity 1452.

The purpose of the illustrated embodiments of the devices is to demonstrate how an embodiment of the invention provides the dynamic digital Kanban board user or users visual and auditory feedback related to the current point value calculation, any number of other calculations, or current board status and activity. These embodiments create a visual and audio scoreboard rather than a numeric score board as illustrated in FIG. 13. The devices in FIGS. 14 A and B allows the users to receive visual and auditory feedback and updates without simultaneously viewing the dynamic digital Kanban board.

Figure 15A:
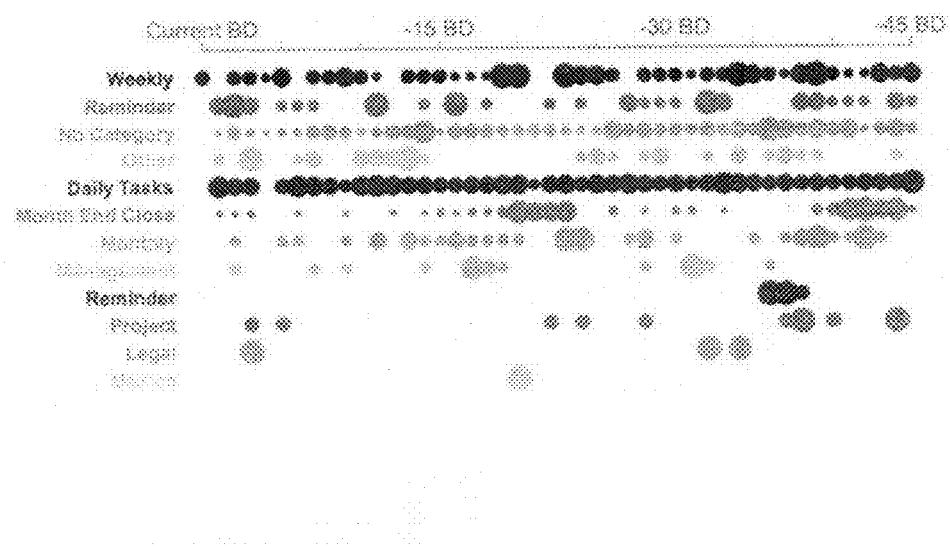
FIG. 15 A is an illustration of a productivity report based on the point value calculation for a 45-day period and FIG. 15 B is an illustration of a productivity report based on the point value calculation for 12-month period.
Figure 15B:
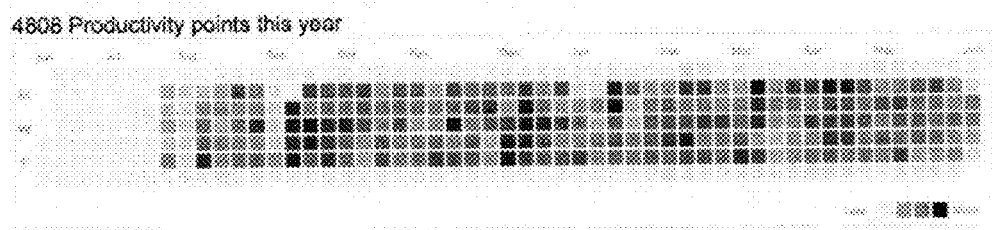

The invention includes displaying or transmitting the scoring calculation and productivity for a specific user, group of users, project, type of cards, or the like in report format by aggregating the calculations described herein by the methods illustrated. This collection of data can be grouped into charts and reports to provide aggregated information into the following:

General activity and point value calculation results over the course of a year grouped by month a and day;

Provide users with predictive areas of improvement based on stored events and machine learning algorithms to improve user or team or group productivity and total point values achieved;

As illustrated in FIG. 15 A reporting on the frequency and consistency of activity by category by period by user, group of users, project;

Reporting the cumulative time all cards spent in a "Doing" status by period by user, group of users, project, or category;

As illustrated in FIG. 15 B reporting the number of cards moved to "Done" status by period by user, group of users, or by project, or card category;

Reporting the complexity of cards moved to "Done" status per period per user, group of users, project, or card category; and, Reporting the priority of cards moved to "Done" status per period per user, group of users, project, or card category.

Although the invention has been described with reference to particular embodiments, these descriptions are not meant to be construed in a limiting sense. Various modifications of the disclosed embodiments as well as alternative embodiments of the invention will become apparent to persons skilled in the art. It is therefore contemplated that the appended claims will cover any such modifications or embodiments that fall within the scope and spirit of the invention as defined by the appended claims.

The invention claimed is:

1. A computer-implemented method of managing a multitude of cards on a digital board, the method comprising of:
    creating a digital board with a number of sections some of which are part of a core grouping of sections;
    associating a core grouping of the said sections to non-standard time unit subdivisions and displaying said sections in a sequential manner;
    for each said section of the core grouping creating nested subsections associated specifically with a progress status;
    creating a number of cards with associated data related to tasks, reminders, or notes;
    associating said cards with said core grouping sections;
    associating said progress status with each said card;
    associating computer-implemented behaviors and functionalities with said cards;
    displaying said cards within the associated said sections to a number of users;
    changing said card associations;
    saving said changes in computer-accessible memory; and
    transmitting notifications related to said changes.

2. The computer-implemented method as set forth in claim 1, further including the step of identifying, quantifying and assigning point values to said card association changes by said users.

3. The computer-implemented method as set forth in claim 2, further including the step of displaying said point values;
    calculating the variances between said point values and predefined target point values or goal values;
    aggregating said point values; and,
    displaying the results.

4. The computer-implemented method as set forth in claim 1, further including a step allowing the selection or deselection of said calendar days to which said sections can be associated.

5. The computer-implemented method as set forth in claim 1, further including a step for duplicating a said card in a plurality of said sections associated with different said calendar days.

6. The computer-implemented method as set forth in claim 1, further including a step of creating additional card associations by stacking said cards within said sections or said subsections.

7. The computer-implemented method as set forth in claim 1, further including a step of executing stored instructions allowing a computing device to change said card's data associations, section and subsection associations, behavior, appearance, functionality, point value, or notifications.

8. The computer-implemented method as set forth in claim 1, further including a step for executing stored instructions allowing a computing device to change the said card's current said section association to a subsequent said section based on said card's associated progress status.

9. The computer-implemented method as set forth in claim 1, further including a step for executing stored instructions allowing a computing device to change said data associated with said card based on said card's age.

10. A method as set forth in claim 3, further including a step for calculating the positive or negative impact of said point values by evaluating changes of said card's associated progress status.

11. The method as set forth in claim 10, further comprising of a step for aggregating and displaying the results of said impact.

12. The method as set forth in claim 1, in which there is a step for initiating and sending an electronic message to a network connected device with capability to emit light and sound.

13. The computer-implemented method as set forth in claim 2, further including a step for executing stored instructions causing a computing device to change the said card's visual appearance, trigger animations, sounds, lights, and points value calculations.

14. A computer-implemented method for managing a multitude of cards on a digital board and network connected electronic device capable of emitting visual and auditory outputs, comprising of:
    creating a digital board with a number of sections some of which are part of a core grouping of sections;
    associating a core grouping of the said sections to non-standard time unit subdivisions and displaying said sections in a sequential manner;
    for each said section of the core grouping creating nested subsections associated specifically with a progress status;
    creating a number of cards with associated data related to tasks, reminders, or notes;
    associating said cards with said core grouping sections;
    associating said progress status with each said card;
    associating computer-implemented behaviors and functionalities with said cards;
    displaying said cards within the associated said sections to a number of users; changing said card associations;
    saving said changes in computer-accessible memory;
    identifying, quantifying and assigning point values to said card association changes by said users;
    calculating a point value change from said changes and saving the point value result in computer-accessible memory; and
    sending instructions based on said point value result to a network connected electronic device to emit visual or audio outputs related to said point value.

15. The computer-implemented method as set forth in claim 14, further including the step of representing said point values in a numeric, visual, or auditory manner;
    calculating the variances between said point values and predefined target point values or goal values;
    aggregating said point values; and,
    displaying the results.

16. A method as set forth in claim 15, further including a step for calculating the positive or negative impact of said point values by evaluating changes of said card's associated progress status.

17. The method as set forth in claim 16, further comprising of a step for aggregating and transmitting instructions to a network connected electronic device to display the results of said impact in a numeric, visual, or auditory manner.

* * * * *